United States Patent [19]
Takahashi

[11] Patent Number: 5,351,445
[45] Date of Patent: Oct. 4, 1994

[54] APPARATUS FOR GRINDING END FACES OF FERRULES TOGETHER WITH OPTICAL FIBERS EACH FIRMLY RECEIVED IN FERRULES

[75] Inventor: Mitsuo Takahashi, Matsudo, Japan

[73] Assignee: Seikoh Giken Co., Ltd., Matsudo, Japan

[21] Appl. No.: 19,303

[22] Filed: Feb. 18, 1993

[30] Foreign Application Priority Data

Dec. 15, 1992 [JP] Japan .................. 4-354537

[51] Int. Cl.$^5$ .................. B24B 7/16; B24B 7/24
[52] U.S. Cl. .................. 451/271; 451/41
[58] Field of Search .............. 51/60, 120, 119, 217 R, 51/283 R, 277

[56] References Cited

U.S. PATENT DOCUMENTS

| | | | |
|---|---|---|---|
| 2,320,376 | 6/1943 | Mueller | 51/120 |
| 3,393,474 | 7/1968 | Buswell | 51/120 |
| 4,291,502 | 9/1981 | Grimsby | 51/120 |
| 4,831,784 | 5/1989 | Takahashi | 51/131.1 |
| 4,979,334 | 12/1990 | Takahashi | 51/120 |
| 5,140,660 | 8/1992 | Takahashi | 385/79 |
| 5,185,966 | 2/1993 | Mock, Jr. | 51/120 |
| 5,265,381 | 11/1993 | Takahashi | 51/234 |

FOREIGN PATENT DOCUMENTS 0157472 12/1980 Japan ................ 51/283 R

Primary Examiner—Robert A. Rose
Attorney, Agent, or Firm—Spencer, Frank & Schneider

[57] ABSTRACT

An apparatus for grinding end surfaces of ferrules together with optical fibers each firmly received therein includes as essential components a platform serving as a base for the apparatus, a grinding board assembly rotationally driven such that a grinding board is displaced along a horizontal reference plane as it is rotated, a ferrule holder for holding the ferrules each of whose foremost end to be ground is oriented toward the grinding board, a ferrule holder supporting member for bringing the ferrule holder to a surface position to be assumed by the ferrule holder on completion of a grinding operation while supporting the ferrule holder, and a thrusting unit for normally thrusting the ferrule holder toward the grinding board. It is desirable that the center of the grinding board assembly be positionally offset from the center of the ferrule holder supporting member. The ferrule holder supporting member may include a plurality of male-threaded support column members for adjustably supporting the ferrule holder while maintaining the horizontal state of the ferrule member relative to the grinding board.

13 Claims, 5 Drawing Sheets

APPARATUS FOR GRINDING END FACES OF FERRULES TOGETHER WITH OPTICAL FIBERS EACH FIRMLY RECEIVED IN FERRULES

BACKGROUND OF THE INVENTION

1. Field of the Invention

The present invention relates generally to an apparatus for grinding end faces of ferrules for optical fiber connectors used for an optical fiber communication system. More particularly, the present invention relates to an improvement of an apparatus of the foregoing type for grinding end faces of optical fibers not only without angular error of each ground surface relative to a center axis of the corresponding optical fiber which arises with a conventional optical fiber end face grinding apparatus, but also without fluctuation of a quantity of each ground end face of the optical fiber.

2. Description of the Related Art

An end face of an optical fiber to be used for an optical fiber connector is usually ground so as to reduce connection loss. It is well known by the ordinary person skilled in the art that tile surfaces at the edges of the ferrule body and optical fiber can be made spherical by simultaneously polishing these surfaces. The spherical surface at the edges of the ferrule body and optical fiber can be obtained by the inclined spherical polishing of the surface on an elastic material disk when the surface is inclined with respect to the elastic material disk because of their circular deflection.

The inventor of the present invention has made several proposals in connection with a grinding operation for end faces of optical fibers. For example, he invented a fundamental technical concept related to a connector of which one end face is slantwise ground with a certain angle (hereinafter referred to simply as an APC representing an angle polish connector) in association with his prior invention (U.S. Pat. No. 5,140,660) of ferrules for optical fiber connectors. In addition, he invented an optical fiber grinding apparatus (U.S. Pat. Nos. 4,831,784 and 4,979,334) in which a technical concept related to an apparatus for simultaneously grinding end faces of a plurality of optical fibers is disclosed.

The present invention has been made to substantially improve the performances of the conventional grinding apparatuses mentioned above. To facilitate understanding of the present invention, the structure and inherent problems of the conventional grinding apparatus will be described below with reference to FIG. 1 to FIG. 3.

Figure 1:
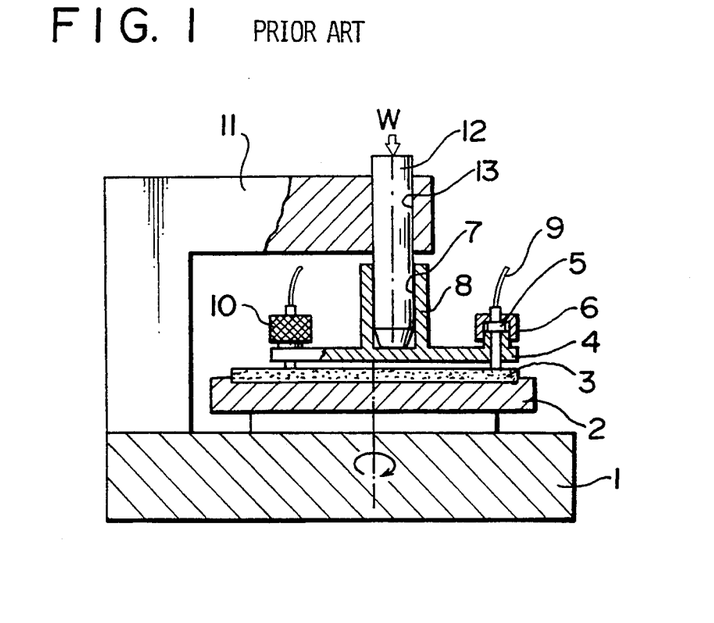
FIG. 1 is a partially exploded side view of a conventional apparatus for grinding end faces of ferrules each having an optical fiber firmly received therein, particularly illustrating a fundamental structure of the conventional apparatus.
Figure 2:
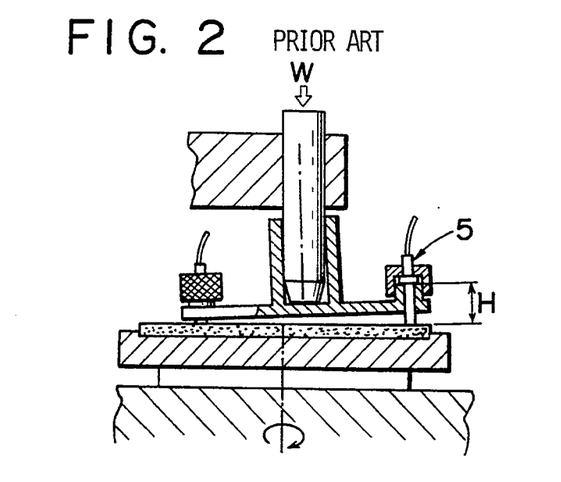
FIG. 2 is a fragmentary sectional side view of the conventional apparatus shown in FIG. 1, particularly illustrating problems inherent to the conventional apparatus arising due to incorrect arrangement of the ferrules on a grinding board.
Figure 3:
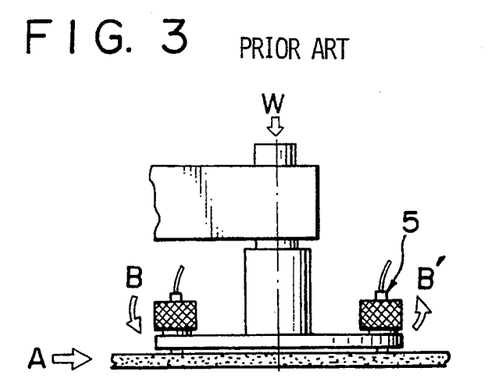
FIG. 3 is a fragmentary side view of the conventional apparatus, particularly illustrating problems arising due to inclination of a ferrule holder as the grinding board is rotated.

FIG. 1 is a partially exploded side view of a conventional apparatus for grinding end faces of a plurality of ferrules each having an optical fiber firmly received therein, schematically illustrating a fundamental structure of the conventional apparatus, and FIG. 2 and FIG. 3 are fragmentary vertical sectional views of the conventional apparatus shown in FIG. 1, particularly illustrating problems inherent in the conventional apparatuses.

As shown in the drawings, the grinding apparatus includes a platform 1 on which a rotary disc 2 and a driving mechanism (not shown) for rotationally driving the rotary disc 2 are mounted.

A circular grinding board 3 is integrally placed on the rotary disc 2 so as to allow them to be rotated together. For example, a rotary disc consisting of a plate-shaped elastic member and an abrasive paper adhesively placed on the elastic member as disclosed in the prior invention (U.S. Pat. No. 5,140,660) relating to a ferrule for an optical fiber connector can be noted as a typical grinding board employable for the grinding board 3.

A plurality of adapters 6 for firmly securing to a circular disc-shaped ferrule holder 4 a plurality of ferrules 5 each having an optical fiber 9 firmly received therein are arranged on the ferrule holder 4 in an equally spaced relationship as seen in the circumferential direction, and a cylindrical portion 8 having a hole 7 formed therein is integrated with the ferrule holder 4 at the central part of the rotary disc 2.

Each ferrule 5 having an optical fiber 9 firmly received therein is fitted into the corresponding adaptor 6 so that it is fixedly secured to the ferrule holder 4 by threadably tightening a cap nut 10.

An arm-shaped support rod holding member 11 is integrated with the platform 1 for the grinding apparatus, and a thrusting support rod 12 having a load W (not shown) applied thereto is inserted through a hole 13 formed at the foremost end of the holding member 11.

When the thrusting support rod 12 is inserted through the hole 7 of the cylindrical portion 8 at the central position of the rotary disc 2, it is thrusted in the direction toward the working surface of the grinding board 3.

As shown In FIG. 2, each ferrule 5 is firmly secured to the corresponding adapter 6 while projecting downward of the lower surface of the ferrule holder 4 by a distance H of 0.2 to 1.0 mm as measured from a reference plane of the adaptor 6 with which a flange of tile ferrule 5 comes in contact, and the foremost end of the ferrule 5 is thrusted against the working surface of the grinding board 3. While the foregoing state is maintained, the foremost end of the ferrule 5 is ground as the grinding board 3 is rotated.

However, with the conventional grinding apparatus constructed in the above-described manner, there often arises a dimensional error $\Delta H$ of 0.05 to 0.2 mm based on the foregoing distance H attributable to an error derived from production of the ferrules 5 arranged on the ferrule holder 4 in that way.

In this case, the grinding load W is concentratively applied to one of the ferrules 5, i.e., a ferrule having a maximum quantity of projection from the ferrule holder 4, causing the ferrule holder 4 to be inclined as shown in FIG. 2. Thus, there is a possibility that the foremost ends of the ferrules 5 are ground while the foregoing inclined state is maintained. In other words, the end faces of the ferrules 5 are unavoidably ground while the parallel state of the lower surface of the ferrule holder 4 relative to the grinding board 3 is incorrectly maintained.

In addition, with the conventional grinding apparatus, there is recognized an undesirable phenomenon that as the grinding board 3 is rotated, the ferrule holder 4 is inclined in the forward direction relative to the rotating direction of the grinding board 3 represented by an arrow A due to the turning moment appearing on the ferrule holder 4 represented by arrows B and B', as shown in FIG. 3.

To prevent the ferrule holder 4 from being inclined in that way, it is necessary that the outer diameter of the thrusting support rod 12, the inner diameter of the hole 7 for receiving the thrusting support rod 12 and the inner diameter of the hole 13 formed through the thrusting rod holding member 11 are finished with higher fitting accuracy. Although careful attention is paid to rigidity of the respective components at the time of designing in order to eliminate or minimize deflection of the thrusting rod holding member 11 and others, the aforementioned problems are left still unsolved because the fitting clearance can not be reduced to a level of zero.

As is apparent from the above description, as far as the conventional grinding apparatus is constructed in the above-described manner, it is very difficult to completely eliminate an angular error relative to the angle defined by the optical axis of each optical fiber and the ground end face of each ferrule due to malfunctions such as fluctuation of the length of each ferrule 5, incorrect positional fitting of the ferrules 5 into the ferrule holder 4 or the like.

In the case of an APC which requires that each ferrule is slantwise ground with an angle of 8 to 12 degrees relative to the optical axis of each optical fiber so as to reduce return reflection loss, there is a possibility that the angular error arising on tile ground face of each ferrule 5 is undesirably amplified due to a large amount of grinding operation to be performed for the end face of the ferrule 5.

SUMMARY OF THE INVENTION

The present invention has been made in consideration of the aforementioned background.

An object of the present invention is to provide an apparatus for grinding end faces of a plurality of ferrules each having an optical fiber firmly received therein wherein a ferrule holder supporting member is improved so as to prevent the aforementioned grinding errors from arising.

Another object of the present invention is to provide an apparatus for grinding end faces of a plurality of ferrules each having an optical fiber firmly held therein wherein the parallel state of a ferrule holder relative to a grinding board assembly can easily and reliably be maintained.

According to one aspect of the present invention, there is provided an apparatus for grinding end faces of a plurality of ferrules together with optical fibers each firmly received therein, wherein the apparatus includes as essential components a platform serving as a base for the apparatus; a grinding board assembly arranged on the platform and adapted to be rotationally driven such that the working surface of the grinding board immovably held on the grinding board assembly is displaced along a horizontal reference plane as it is rotated; a ferrule holder for holding the ferrules each of whose foremost end to be ground is oriented toward the working surface of the grinding board; a ferrule holder supporting member for bringing the ferrule holder to a surface position to be assumed by the ferrule holder on completion of a grinding operation while supporting the ferrule holder, the surface position being located in parallel with the reference plane; and biasing means for biasing the ferrule holder toward the working surface of the grinding board.

It is desirable from the viewpoint of performing an effective grinding operation that the center of the grinding board assembly is positionally offset from the center of the ferrule holder supporting member.

The grinding board assembly consists of a grinding board and a circular rotary disc having the grinding board integrally placed thereon, and the rotary disc is rotationally driven by a conventional rotational driving mechanism.

The ferrule holder supporting member includes a plurality of column-shaped fitting pins at the upper end thereof so that the fitting pins are fitted into the corresponding holes formed through the ferrule holder so as to support the ferrule holder with the aid of the pin-hole coupling function while maintaining the parallel state of the ferrule holder relative to the grinding board assembly.

The ferrule holder is prepared in the form of a circular disc on which the ferrules are arranged around a first circle in the equally spaced relationship, and the pin-hole coupling function is established around a second circle located outside of the first circle.

A plurality of holes are formed through the ferrule holder so that the ferrules are fitted through the holes in the vertical direction or in the inclined state.

It is preferable that the dead weight of the ferrule holder itself serves as biasing means. Alternatively, a sum of the dead weight of the ferrule holder and the dead weight of weight(s) placed on the ferrule holder may serve as biasing means. Otherwise, the dead weight of the ferrule holder and a spring disposed on the ferrule holder may serve as a biasing holder.

In addition, according to other aspect of the present invention, there is provided an apparatus for grinding end faces of a plurality of ferrules together with optical fibers each firmly received therein, wherein the apparatus includes as essential components a platform serving as a base for the apparatus; a grinding board assembly arranged on the platform and adapted to be rotationally driven such that the working surface of a grinding board immovably held on the grinding board assembly is displaced along a horizontal reference plane as it is rotated; a ferrule holder for holding the ferrules each of whose foremost end to be ground is oriented toward the working surface of the grinding board; a ferrule holder supporting member for supporting the ferrule holder thereon to bring the ferrule holder to a surface position to be assumed by the ferrule holder on completion of a grinding operation, the surface position being located in parallel with the reference plane, and the ferrule holder supporting member including a plurality of male-threaded support column members of which upper surfaces are threadably adjusted such that they are correctly aligned with each other to extend along a horizontal plane corresponding to the surface position of the ferrule holder to be assumed by the ferrule holder on completion of the grinding operation, each of the male-threaded support column members having a column-shaped fitting pins integrated therewith at the upper end thereof, the fitting pin being fitted into the corresponding hole formed through the ferrule holder so as to support the ferrule holder with the aid of the pin-hole coupling function while maintaining the parallel state of the ferrule holder relative to the grinding board assembly; and biasing means for biasing the ferrule holder toward the working surface of the grinding board.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

The present invention will be described in detail hereinafter with reference to the accompanying drawings which illustrate preferred embodiments thereof.

Figure 4:
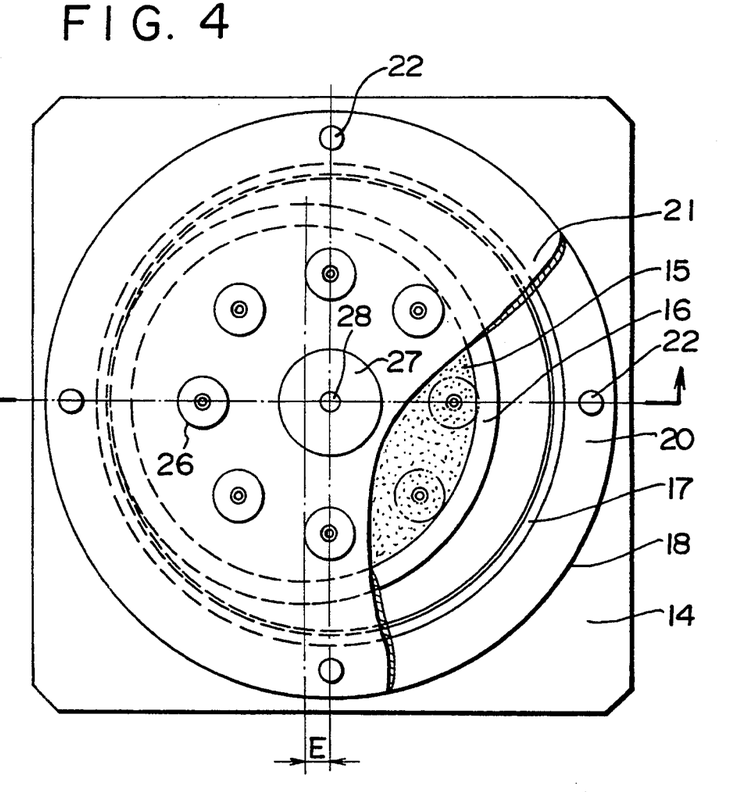
FIG. 4 is a partially exploded plan view of an apparatus for grinding end faces of ferrules each having an optical fiber firmly received therein in accordance with an embodiment of the present invention.

FIG. 4 is a plan view of an apparatus for grinding end faces of a plurality of ferrules each having an optical fiber firmly received therein in accordance with an embodiment of the present invention. To facilitate understanding of the inner structure of the apparatus, a part of the apparatus is shown in an exploded form.

Figure 5:
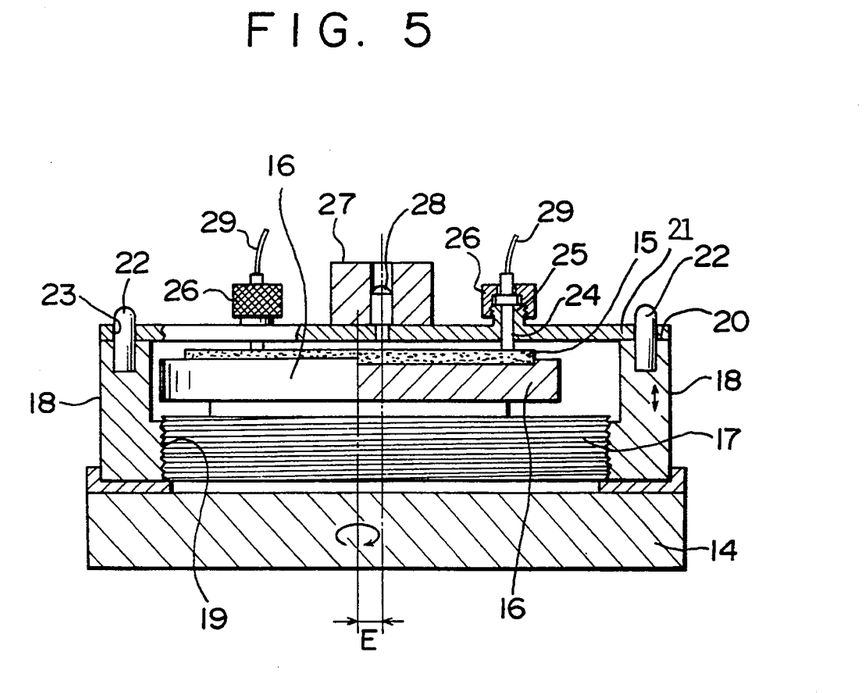
FIG. 5 is a sectional side view of the apparatus shown in FIG. 4.

FIG. 5 is a sectional side view of the apparatus shown in FIG. 4.

As is apparent from the drawings, the apparatus includes as essential components a grinding board assembly comprising a grinding board 15, a circular rotary disc 16 integrated with the grinding board 15 while holding the latter thereon, and a driving mechanism for rotationally driving the rotary disc 16.

The grinding board assembly is mounted on a platform 14 in which the rotary disc driving mechanism is incorporated. In this embodiment, a rotary disc driving mechanism of the type comprising a motor, a speed reduction unit and a circular disc driving unit for eccentrically driving a circular rotary disc are employed for the apparatus. As is best seen in FIG. 4, the rotary disc 16 is eccentrically rotated by driving a conventional driving mechanism while a quantity of eccentricity E relative to the center of the apparatus is maintained.

A circular rotary disc driving mechanism as disclosed in U.S. Pat. No. 4,979,334 is a typical conventional circular rotary disc driving mechanism employable for the apparatus of the present invention.

Provided that the working surface of the grinding board 15 can be displaced relative to the end faces of ferrules to be ground along a horizontal reference plane represented by r - p (FIGS. 6 and 7) any type of circular rotary disc driving mechanism can be employed for carrying out the present invention.

If the grinding board 15 is designed to perform normal rotating movement, it is required that a plurality of adapters 26 are arranged corresponding to ferrules 24 to be ground in such a manner that an abrasive grain surface of the grinding board 15 wears uniformly.

For example, a grinding board comprising a plate-shaped circular board made of an elastic material and an abrasive paper adhesively placed on the circular board (as disclosed in U.S. Pat. No. 5,140,660, i.e., a prior invention relating to a ferrule for an optical fiber connector) can be employed for the apparatus of the present invention. Alternatively, a grinding board having a surface which is deformed so as to spherically grind the foremost end of an optical fiber connector is also employable.

A male-threaded portion 17 is made integral with the platform 14 for threadably holding a ferrule holder supporting member 18, and the foregoing rotary board driving mechanism is accommodated in the male-threaded portion 17.

The ferrule holder supporting member 18 adapted to hold a ferrule holder 21 is prepared in the form of a cylindrical member, and a female-threaded portion 19 is formed in the ferrule holder supporting member 18 corresponding to the male-threaded portion 17.

The height of an upper end surface 20 of the ferrule holder supporting member 18 can be adjusted by properly adjusting the threadable connecting position where the male-threaded portion 17 of the platform 14 is threadably engaged with the female-threaded portion 19 of the ferrule holder supporting member 18.

Four column-shaped pins 22 for correctly determining the angular position of the ferrule holder 21 stand upright on the upper end surface of the ferrule holder supporting member 18.

The ferrule holder 21 is prepared in the form of a circular plate which is placed on the ferrule holder supporting member 18 in the pin-hole coupling relationship. Holes 23 are formed through the ferrule holder 21 at the positions corresponding to the column-shaped pins 22 around the outer peripheral edge of the ferrule holder 21 so as to allow the pins 22 to be fitted into the corresponding holes 23.

A plurality of adapter projections 25 each having a guide hole defining a certain ferrule fitting angle formed therein to hold a ferrule 24 having an optical fiber 29 firmly received therein are made integral with the ferrule holder 21. In the case of APC, the ferrule fitting angle of the guide hole is set to about 8 degrees.

The ferrule 24 includes a flange which is firmly placed on the upper surface of the projection 25 by threadably tightening a cap nut 26.

In addition, a column-shaped position determining pin 28 and an auxiliary weight 27 having a predetermined weight serving as a grinding load and fitted onto the pin 28 in a concentrical relationship is disposed at the central part of the ferrule holder 21.

Next, a process of properly adjusting the height of the ferrule holder supporting member 18 will be described with reference to FIG. 6 and FIG. 7.

Figure 6:
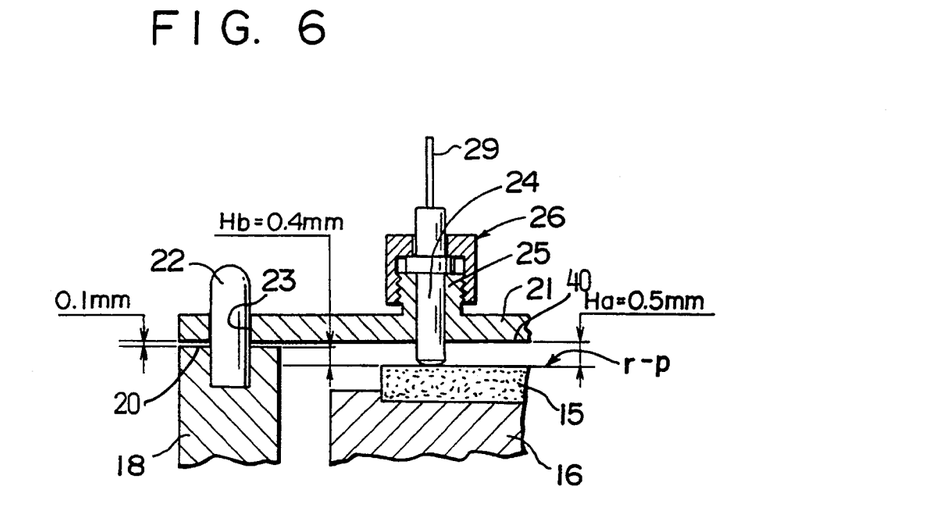
FIG. 6 is a fragmentary sectional side view of the apparatus shown in FIG. 4, particularly illustrating the positional relationship among components for the apparatus directly before a grinding operation is started for the end faces of the ferrules.

FIG. 6 is a fragmentary sectional side view of the apparatus prior to a grinding operation. In a case in which the projection of ferrule 24 from the lower surface 40 represented by Ha is set to 0.5 mm and the amount of ferrule to be ground is set to 0.1 mm, the ferrule holder supporting member 18 is adjustably rotated so as to allow a dimensional difference Hb between an upper surface of the grinding board 15, i.e., a reference plane represented by r - p and the upper end surface 20 of the ferrule holder supporting member 18 to assume a value of 0.4 mm.

In this case, as shown in FIG. 6, the ferrule holder 21 is held at the initial position in such a state that the lower surface 40 of the ferrule holder 21 is floated up from the upper end surface 20 of the ferrule holder supporting member 18 by a distance of 0.1 mm. As the end faces of the ferrules 24 are ground, the ferrule holder 21 is lowered with the aid of the aforementioned pin-hole coupling function while maintaining the parallel state of the ferrule holder 21 relative to the grinding board 15.

Figure 7:
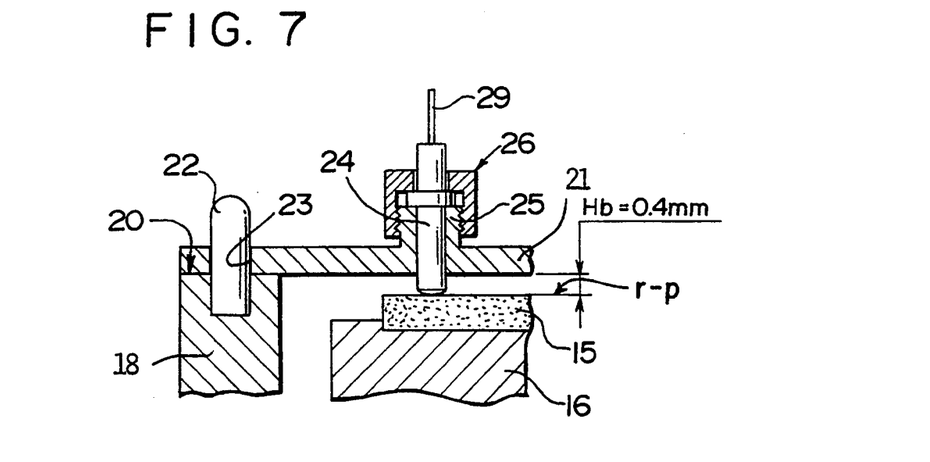
FIG. 7 is a fragmentary sectional side view of the apparatus shown in FIG. 4, particularly illustrating the positional relationship among the components for the apparatus after completion of the grinding operation.

Finally, as shown in FIG. 7, the lower surface of the ferrule holder 21 is lowered to the position where it is brought in close contact with the upper end surface 20 of the ferrule holder supporting member 18 while the parallel state of the ferrule holder 21 relative to the grinding board 15 is maintained with the aid of the pin-hole coupling function, whereby the grinding operation is completed. At this time, the lower surface of tile ferrule holder 21 is located in parallel with the reference surface of the grinding board represented by r-p.

While the parallel state of the lower surface 40 of the ferrule holder 21 relative to the working surface of the grinding board 15 is exactly maintained in the above-described manner, the end faces of the respective ferrules can be ground without any malfunction such that an angular error arises on the ground end surface of each ferrule.

Figure 8:
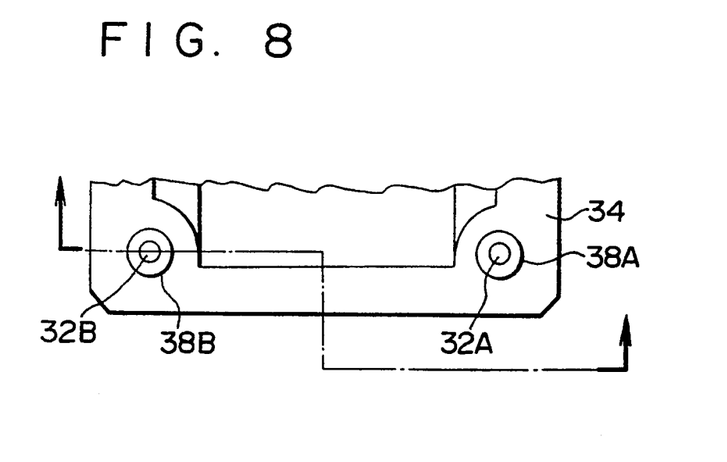
FIG. 8 is a fragmentary plan view of a platform serving as a base for the apparatus in accordance with a modified embodiment of the present invention, particularly illustrating that a plurality of male-threaded support column members are arranged at four corners of the platform for supporting a ferrule holder.
Figure 9:
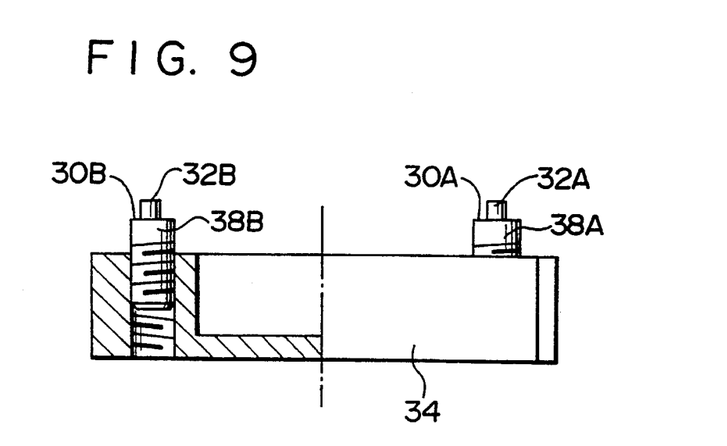
FIG. 9 is a side view of the platform shown in FIG. 8 wherein the left half of the same is shown by way of a vertical sectional view.

FIG. 8 is a fragmentary plan view of a platform serving as a base for the apparatus in accordance with a modified embodiment of the present invention, particularly illustrating four male-threaded support column members arranged at four corners of the platform, and FIG. 9 is a side view of the platform shown in FIG. 8 wherein the left half of the drawing is shown by way of a sectional view. A platform 34 for the apparatus includes four male-threaded support column members 38A and 38B at four corners thereof, and the male-threaded support column members 38A and 38B are threadably fitted into the platform 34 so as to properly adjust the height of each of the male-threaded support column members 38A and 38B as measured from the upper surface of the platform 34. Column- shaped pins 32A and 32B corresponding to the column-shaped pins 22 in the preceding embodiment are disposed on the male- threaded support column members 38A and 38B in order to properly determine the position to be assumed by the ferrule holder 21.

Upper surfaces 30A and 30B of the male-threaded support column members 38A and 38B are individually adjusted in such a manner that they are correctly aligned with each other to extend along a single horizontal plane which defines the lowermost surface position 40 of the ferrule holder 21. In other words, the foregoing horizontal plane coincides with the lower surface 40 of the ferrule holder 21.

The present invention has been described above with respect to the embodiment wherein a subject to be ground is an optical fiber having a sheath removed therefrom. However, the present invention should not be limited only to this embodiment but it may equally be applied to other type optical fiber, e.g., a ribbon-shaped type optical fiber.

In the aforementioned embodiment, a single weight is employed as biasing means for biasing the ferrule holder toward the working surface of the grinding board. Alternatively, a plurality of weights may be employed as biasing means. Otherwise, spring(s) may be employed as biasing means.

What is claimed is:

1. An apparatus for grinding end faces of a plurality of ferrules each having an optical fiber firmly received therein, comprising:
   a platform;
   a grinding board assembly mounted on said platform, said grinding board assembly including
      a grinding board having a working surface; and
      a driving mechanism for rotating said grinding board while simultaneously displacing said board along a horizontal reference plane;
   a single ferrule holder for holding said plurality of ferrules, the end face of each of said ferrules being oriented toward the working surface of said grinding board;
   ferrule holder supporting means for movably supporting said ferrule holder, a surface of said ferrule holder being positioned by said ferrule holder supporting means in parallel with said reference plane upon completion of a grinding operation; and
   biasing means for biasing said ferrule holder toward the working surface of said grinding board.

2. The apparatus according to claim 1, wherein a center of said grinding board assembly is positionally offset from a center of said ferrule holder supporting means.

3. The apparatus according to claim 1, wherein said grinding board assembly further consists of a circular rotary disc having said grinding board integrally placed thereon, said rotary disc being rotationally driven by said driving mechanism.

4. The apparatus according to claim 1, wherein said ferrule holder supporting means has an upper end surface in close contact with a lower surface of said ferrule holder on completion of the grinding operation.

5. The apparatus according to claim 1, wherein said ferrule holder supporting means includes a plurality of column-shaped fitting pins at an upper end surface thereof, said fitting pins being fitted into corresponding holes in said ferrule holder so as to determine the angular position of said ferrule holder while maintaining said ferrule holder parallel to said grinding board assembly.

6. The apparatus according to claim 5, wherein said ferrule holder is a circular disc on which said plurality of ferrules are arranged around a first circle in an equally spaced relationship, and said fitting pins are arranged around a second circle located outside of said first circle.

7. The apparatus according to claim 1, wherein a plurality of holes are formed through said ferrule holder, said plurality of ferrules being fitted therethrough in a direction perpendicular to said reference plane.

8. The apparatus according to claim 1, wherein said biasing means comprises a weight of said ferrule holder.

9. The apparatus according to claim 1, wherein said biasing means comprises a weight of said ferrule holder and spring means disposed on said ferrule holder.

10. The apparatus according to claim 1, wherein a plurality of holes are formed through said ferrule holder, said plurality of ferrules being fitted therethrough at an acute angle with respect to said reference plane.

11. The apparatus according to claim 10 wherein said acute angle is about 8 degrees.

12. The apparatus according to claim 1, wherein said biasing means comprises a sum of a weight of said ferrule holder and a weight of an auxiliary weight placed on said ferrule holder.

13. An apparatus for grinding end faces of a plurality of ferrules each having an optical fiber firmly received therein, comprising:
- a platform;
- a grinding board assembly mounted on said platform, said grinding board assembly including
  - a grinding board having a working surface; and
  - a driving mechanism for rotating said grinding board while simultaneously displacing said board along a horizontal reference plane;
- a single ferrule holder for holding said plurality of ferrules, the end face of each of said ferrules being oriented toward the working surface of said grinding board;
- ferrule holder supporting means for movably supporting said ferrule holder, a lower surface of said ferrule holder being positioned by said ferrule holder supporting means in parallel with said reference plane upon completion of a grinding operation;
- a plurality of male-threaded support column members, each having an upper surface, threadably fitted into said platform, the upper surfaces of said column members being aligned along a horizontal plane corresponding to the lower surface of said ferrule holder upon completion of said grinding operation;
- a plurality of column-shaped fitting pins, each of said pins being disposed on the upper surface of one of said column members, each of said fitting pin being fitted into a corresponding hole formed through said ferrule holder so as to determine the angular position of said ferrule holder while maintaining said ferrule holder parallel to said grinding board assembly; and
- biasing means for biasing said ferrule holder toward the working surface of said grinding board.

* * * * *